April 22, 1952 — R. L. FREAS — 2,593,432
AUTOMATICALLY OPERATED RADIO BUOY
Filed June 18, 1948 — 2 SHEETS—SHEET 1

INVENTOR.
RAYMOND L. FREAS

ATTORNEY

April 22, 1952   R. L. FREAS   2,593,432
AUTOMATICALLY OPERATED RADIO BUOY
Filed June 18, 1948   2 SHEETS—SHEET 2

INVENTOR.
RAYMOND L. FREAS
BY *M. C. Hayes*
ATTORNEY

Patented Apr. 22, 1952

2,593,432

UNITED STATES PATENT OFFICE 2,593,432

AUTOMATICALLY OPERATED RADIO BUOY

Raymond L. Freas, Conshohocken, Pa.

Application June 18, 1948, Serial No. 33,835

28 Claims. (Cl. 250—17)

(Granted under the act of March 3, 1883, as amended April 30, 1928; 370 O. G. 757)

This is a continuation in part of my copending application Serial No. 634,134, filed December 10, 1945, for a Radio Float, which is now abandoned.

This invention pertains to the art of signalling, and it comprises apparatus operable automatically to send out signals. More particularly, the device of the invention is adapted to be thrown to the earth from a moving vehicle. When it reaches the earth the device conditions itself automatically for transmitting signals, and thereafter operates to transmit signals for a predetermined length of time.

For example, the device of the disclosure is adapted to be launched from an aircraft in flight when the aircraft is over a body of water, the object being that the device will occupy a predetermined spot on the surface of the water from which it sends out signals that enable the launching craft to be located. The device descends to the surface of the water with a minimum of deviation from a path that is vertically downward from the launching craft, and the position of the device on the water surface is thereby located accurately. A particular weight distribution of the components of the device contributes to this purpose being attained.

A parachute is embodied in the device, the parachute operating to open after a predetermined time interval following launching of the device, so that ambient air currents of the launching craft do not interfere with accurate location of the device. The parachute enables the device to strike the water gently to avoid its injury from shock. When it reaches the water, the device immediately operates to right itself into position for sending signals, and it contains mechanism that works automatically to set up and operate the device as a signalling apparatus.

Signals are transmitted by the device for a predetermined time interval, after which the device operates to destroy itself, thereby to avoid its getting into the hands of persons unauthorized to have it.

A preferred embodiment of the invention is disclosed in the accompanying drawings, to which attention is now directed for a fuller understanding of the principles and operation thereof. In the drawings—

General arrangement of components

Figures 1, 2, 3, 6, 8:
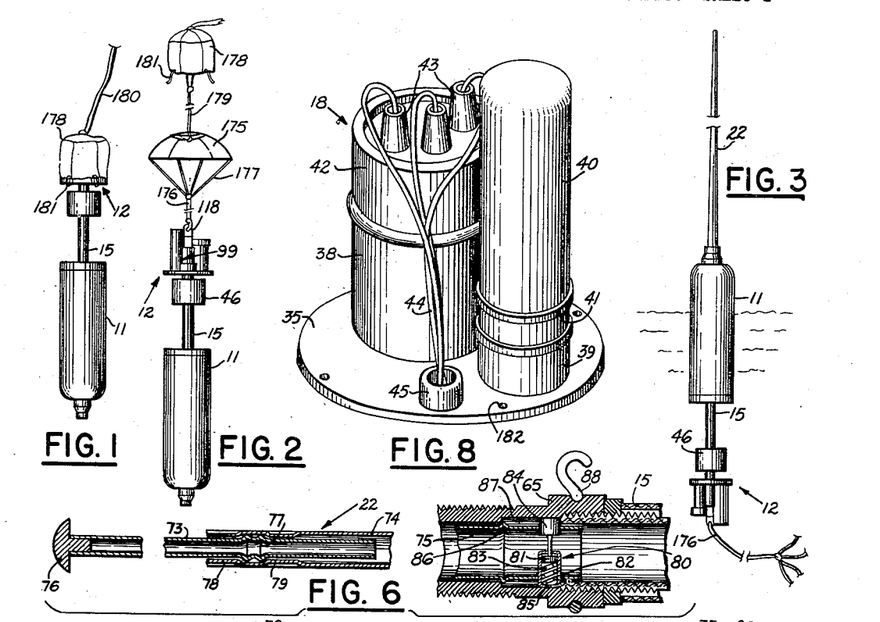
Fig. 1 is an elevation of the device as it appears in condition for launching.
Fig. 2 shows the device in position to descend parachute borne.
Fig. 3 shows the device in operating position for sending signals.
Fig. 6 is a cross-sectional elevation of the antenna through a longitudinal center-plane thereof, illustrating the antenna in extended condition.
Fig. 8 is a perspective of the power component of the device and Fig. 9 is an elevation, partly in section, of the power component.

The device of the disclosure comprises a buoyancy component 11, Figs. 1, 2 and 3, and a component 12 that constitutes a ballast mass, the components 11 and 12 being positioned at opposite ends of the device, and being attached to each other by means of an intermediate connecting member 15.

Figure 4:
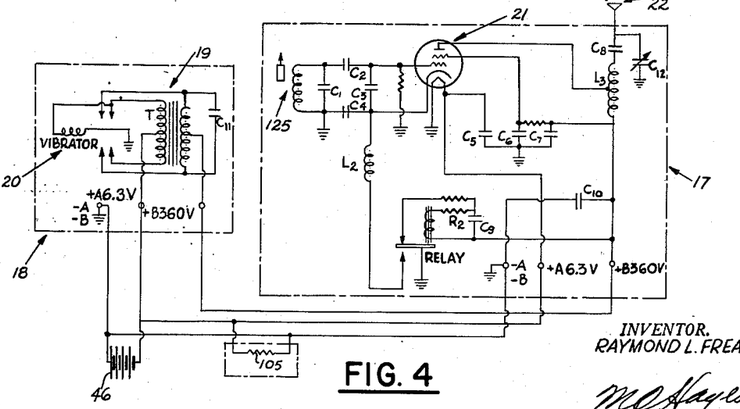
Fig. 4 is a wiring diagram of one suitable embodiment of the device.

As a signalling apparatus, the device comprises a radio transmitting set, which may embody any of a number of suitable radio transmitter circuits. The circuit of the wiring diagram in Fig. 4 has been employed and operated successfully. The disclosed circuit consists of a transmitting or signalling component 17, and a power supply component or power pack 18. Radio transmission circuits as such being well known in the art, detailed description of the elements of the circuit shown in Fig. 4 is deemed unnecessary for understanding the present invention. The important consideration is that the elements of the radio transmitter are so positioned and assembled in the device as to provide a predetermined weight distribution, with the heavier pieces embodied in the ballast mass 12 and the lighter pieces contained in the buoyancy component 11.

The power component 18 embodies pieces that are comparatively heavy, such as the transformer 19, and the vibrator 20. The elements of the transmitting or signalling component 17, such as the electron discharge tube 21, and the various coils, resistors, and condensers shown in Fig. 4, are pieces that are relatively light-weight. This being so, it has been found expedient for carrying out the purposes of the present invention to embody the power pack 18 in the ballast mass 12, and to contain most or all of the elements of the signalling component 17 in the buoyancy component.

The antenna 22 is of the extensible type, and in collapsed condition it is no longer than the overall length of the structure as illustrated in Fig. 1. The antenna 22 in collapsed condition is housed in the connecting member 15, which accordingly is made tubular to accommodate the antenna.

*Ballast mass 12*

Figure 9:
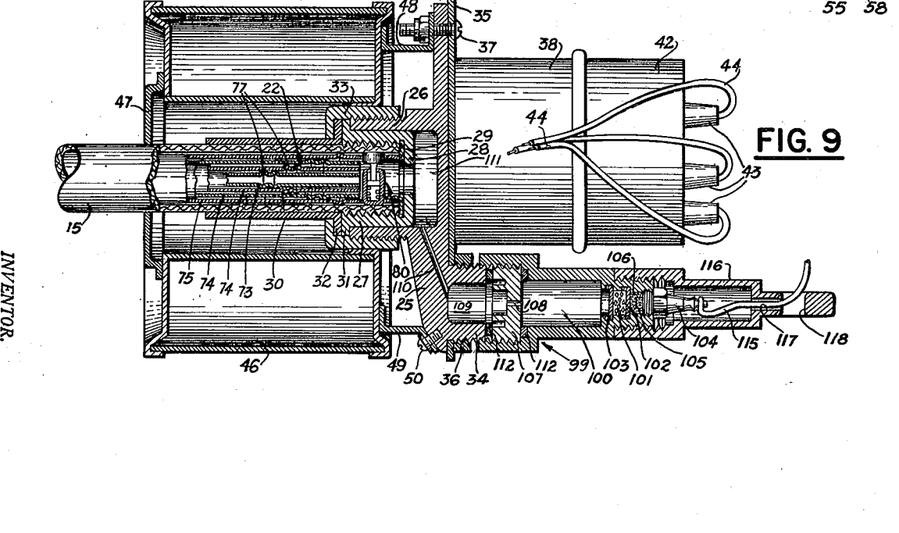

As illustrated in Fig. 9, the ballast mass 12 is carried or supported by the bracket 25 which embodies the nipple 23 to which the connecting member 15 is attached. The connecting member 15 is preferably constructed of dielectric material, and in the disclosed embodiment consists of a length of impregnated fiber tubing. The tube 15 is screw-threaded at one end to receive the bushing 27 which has an interiorly directed shoulder 28 and contains the washer 29 that seats against the end of the tube 15. The sleeve 30 fits the tube 15 exteriorly and provides added rigidity where it is attached to the support 25. The bushing 27 and the reinforcing sleeve 30 are provided with respective exteriorly directed flanges or shoulders 31 and 32, which are engaged by the coupling nut 33 which is threaded to the nipple 26. The support bracket 25 thereby is rigidly attached to the tube 15 at its end.

The bracket 25 comprises the additional nipple 34 on the side thereof opposite the nipple 26, the nipple 34 providing one attachment for the plate 35 to the bracket 25 by means of the nut 36, bolt 37 providing an additional attachment.

The plate 35 serves as a support or base for the power pack 18 which is embodied in the structure now to be described. The housing 38, Figs. 8 and 9, is attached to the plate 35 by riveting or in any other suitable manner, and contains the transformer 19 together with some of its associated elements. The housing 39 is also attached to the plate 35 in a similar manner, and serves as a mounting for the vibrator 20 that is sealed in its housing 40. The housings 40 and 39 are attached together by any suitable watertight connection 41, preferably of rubber or the like material, the connector 41 with housing 39 providing whatever container space is needed for any other elements of the power pack that are mounted on plate 35. The housings 38 and 39 are connected by any suitable watertight conduit (not shown), through which the electrical conductors extend between the various elements of the power pack 18 which are contained in the several housings 38, 39, 40 and 41. A closure 42 of rubber or the like material is provided to seal the housing 38 watertight, closure 42 being provided with integral grommets 43 through which the leads 44 from the power pack 18 pass to other electrical components of the device. The leads 44 are insulated with waterproof insulation, and are preferably formed into a cable as shown, and the cable of leads 44 extends away from the power pack 18 through grommet 45 seated in the plate 35.

Battery 46, Fig. 9 serves as a suitable generator of electrical energy, and is preferably of the type that is sensitized by water, whereby it is inactive in its original state but becomes activated by being placed in water. Use of the water sensitized battery 46 eliminates the need of electrical switches in the electrical circuit of the device. The battery 46 comprises the bracing flange 47 at its one end that fits around the tube 15, and at its other end the battery fits snugly around the coupling nut 33 as shown. The battery 46 is attached to the bracket 25 by means of the posts 48 and 49, respectively held by the bolt 37 and the screw 50, and serves as additional ballast mass.

*Buoyancy component 11*

Figure 7:
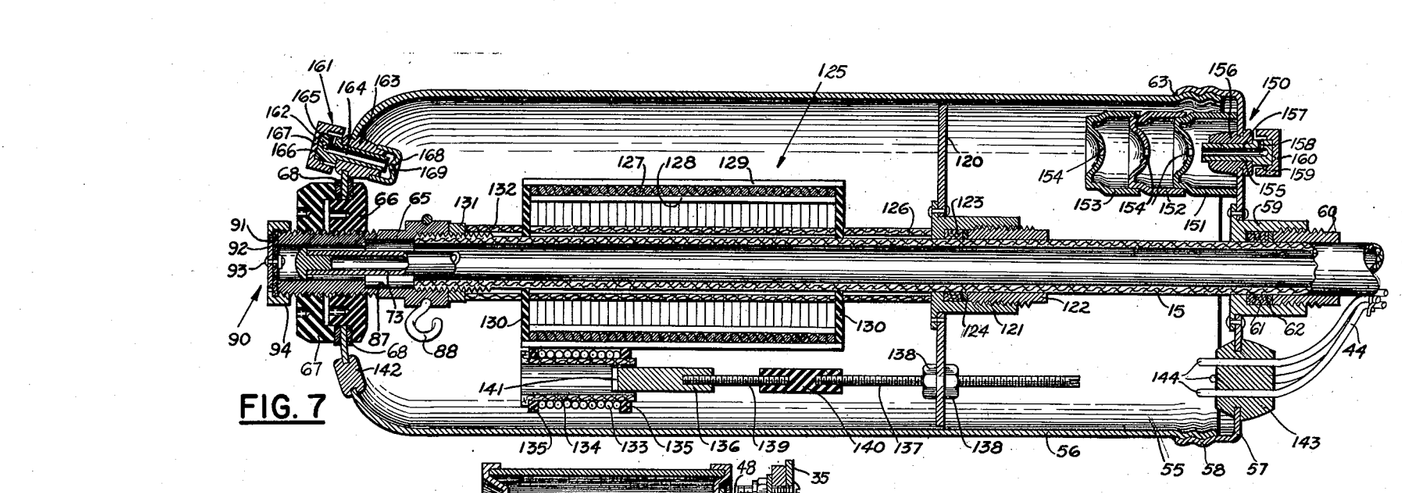
Fig. 7 is a cross-sectional elevation of the buoyancy component of the device.

The buoyancy component 11 comprises the buoyancy chamber 55, Fig. 7, which is preferably cylindrical and arranged to be supported by the tube 15, which extends concentrically lengthwise thereof. The buoyancy chamber 55 embodies an elongated container 56 of copper, brass or other suitable material, having a closure or lid 57 of like material that is removably attached thereto by means of screw threads 58 for example. For completing assembly of the device to make it ready for its intended use, the threads 58 are preferably sealed watertight when the lid 57 is attached to the container 56, brazing material 63 or the like being employed for the purpose.

At one end of the buoyancy chamber 55, in the center of the lid 57 for example, there is a collar 59 through which the tube 15 passes. The gland nut 60, in the form of a sleeve, is provided to seal the tube 15 exteriorly, and to prevent moisture from entering the buoyancy chamber 55 between the tube 15 and the collar 59, packing 61 being included for the purpose. The packing 61 is preferably a piece of tubing of rubber or the like compressible material that presses tightly against the outer wall of the tube 15 when the sleeve 60 is tightened in the collar 59, the washer 62 of fiber or the like material being employed so that the packing 61 will not adhere to and turn with the sleeve 60. By means of the described construction the buoyancy chamber 55 at one of its ends is firmly attached to the tube 15, the opposite end of the chamber 55 being attached to the end of the tube 15 remote from the ballast mass 18 by means of structure now to be described.

The metal sleeve 65 serves as an antenna coupling in a manner to be described hereinafter, and is attached to the end of the tube 15 remote from the power pack 18, the tube 15 being screw-threaded at its end as shown for the purpose. This places the sleeve 65 proximate to the end of the buoyancy chamber 55 that embodies the bottom of the container 56.

The clamping disc 66 of dielectric material is threaded onto the sleeve 65 and positioned inside the container 56, and a similar clamping disc 67 of dielectric material is threaded onto the sleeve 65 exteriorly of the container 56. Discs 66 and 67 are screwed towards each other on sleeve 65 to engage the bottom of the container 56 and clamp the sleeve in rigid engagement with the incident end of the chamber 55, washers 68 being employed to form a watertight seal of the hole in chamber 55 that receives attachment of the sleeve 65.

The described construction serves to hold the antenna housing tube 15 concentric with the buoyancy chamber 55 and concentric with the antenna 22. One end of the tube 15 being attached to one end of the elongated buoyancy chamber 55 by means of the sleeve 65, the tube 15 extends away from the attachment 65 through the chamber 55 lengthwise to the opposite end thereof embodying the closure 57, the tube 15 being projected therebeyond. The ballast mass 12 is attached to the projected end of tube 15 in the manner hereinbefore described.

*Antenna 22*

Figure 5:
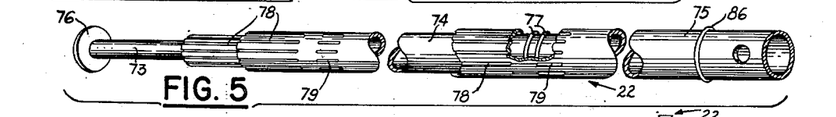
Fig. 5 is a detail of one form of antenna for the device.

The antenna 22, Figs. 5, 6 and 9 comprises a plurality of metallic tubes that are arranged telescopically, there being an innermost interior tube 73, an outermost exterior tube 75, and as many intermediate tubes 74 as are required to produce the desired length of antenna when they are extended.

The interior tube 73, and each of the intermediate tubes 74, is provided near its base end with a pair of annular external ridges 77, that are spaced apart lengthwise of the tube, the ridges 77 being preferably formed by crimping the tubing circumferentially. At the vertex of each intermediate tube 74, and of the exterior tube 75, there is arranged around the periphery of the tube a set of longitudinally disposed internal ridges 78, and these serve to taper the vertex of each larger tube 74, 75 to fit the external circumference of its next adjacent smaller tube 73 or 74. Each larger tube 74, 75 is provided with a similar set of longitudinal ridges 79 spaced away from its vertex, the set of ridges 79 being spaced apart from the sets of ridges 78 as shown. The sets of ridges 78 and 79, also, are preferably formed by crimping the tubing. The lengthwise spacing between sets of ridges 78 and 79 is made to fit over the spaced apart annular ridges 77 of respectively next smaller tubes. The described construction is a convenient expedient for sealing each smaller tube 73 or 74 within its next larger neighboring tube 74 or 75, and for providing bearing surface of limited extent between adjacent tubes to reduce friction when the tubes are slid lengthwise of each other to extend the antenna 22. When the antenna 22 is in extended condition, the pair of annular ridges 77 at the base of each smaller tube 73 and 74 lodges between the sets of longitudinal ridges 78 and 79 at the vertex of its next larger tube 74 or 75, in the manner illustrated in Fig. 6, and this serves to prevent collapse of the erected antenna 22. The seals formed by the annular ridges 77 and the longitudinal ridges 78 and 79 between tubes 73 and 74 and their respective next larger tubes 74 or 75 is sufficient to prevent excessive escape of pressure fluid from within the expanding fluid chamber formed by the tubes 73, 74 and 75.

The butt end of the exterior tube 75 abuts against the gasket 29, which is backed by the interiorly directed shoulder 28 of the bushing 27. Near its butt end, the exterior tube 75 is provided with the retaining member 80, that comprises a plunger 81, Fig. 6, movable in the barrel 82, the plunger 81 and barrel 82 being urged radially outwardly from each other by the spring 83. The plunger 81 comprises the abutment head 84, and the barrel 82 comprises a companion opposite abutment end 85. The abutment head 84 and the abutment end 85 ride in spring-pressed engagement with the inside wall of the tube 15 along diametrically opposite cylinder-elements while the exterior antenna tube 75 is being projected lengthwise of the housing tube 15 to erect the antenna 22. There is also an annular external ridge 86 near the butt end of the exterior antenna tube 75 that is formed similar to ridges 77, the ridge 86 being spaced away from the retaining member 80 lengthwise of the tube 75. The ridge 86 rides on the inside surface of the tube 15.

The bore of the sleeve 65 at its extremity is of slightly less diameter than the internal diameter of the tube 15, and it is also smaller than the outside diameter of ridge 86, the bore of the sleeve 65 being stepped as shown in Figs. 6 and 7 to provide the recess 87 where it is joined to the end of the tube 15. When the exterior antenna tube 75 is in fully extended position, the annular ridge 86 thereof and the retaining member 80 become confined in the recess 87, in the manner illustrated in Fig. 6, to hold the antenna 25 firmly in erected position and to prevent its collapse. The spring clip 88 is attached to the sleeve 65 exteriorly to provide an antenna-coupling terminal, the antenna circuit being from tubes 73, 74, 75 through the retaining member 80 to the sleeve 65 and terminal 88, and being insulated from ground by means of fiber tube 15 and the clamping discs 66 and 67.

The interior tube 73 of the antenna is provided at its vertex with a button 76 that closes the antenna 22 at its tip, and also constitutes an abutment member that serves in a manner to be described hereinafter.

The closure 90 for the antenna-housing tube 15 confines the antenna 22 therein in collapsed condition. The closure 90, according to the preferred construction shown, comprises a disc 91 of blotting paper or the like material, which is reinforced by means of a disc 92 of metal or the like rigid material, the discs 91 and 92 being attached to each other by means of the rivet 93. The cap 94 screws onto the end of the sleeve 65, thereby engaging the blotting-paper disc 91. The metal disc 92 is large enough to cover the aperture through 65, but is small enough to pass freely through the aperture of cap 94.

The closure 90 confines the antenna 22 within the tube 15 during storage and until the device of the invention is placed in use. The closure 90 projects downwardly as seen in Fig. 2 when the device strikes the water, and the metal disc 92 presses against the end of sleeve 65 to reinforce the blotting-paper disc 91 against collapsing under the pressure of the water, and to prevent water from entering the tube 15. Water is absorbed by the blotting paper of disc 91, which thereby begins to disintegrate and lose its strength. When the device becomes righted in the water, the disc 91 having lost its strength offers ineffectual resistance to the tubes 73, 74 and 75 being extended, and the blotting paper is sheared at the periphery of the aperture through cap 94 by the button 76 pressing against it to erect the antenna 22. The antenna 22 is thereby extended out of the end of the tube 15 and beyond the end of the buoyancy chamber 55 in the manner illustrated in Fig. 3.

*Antenna erecting drive*

The mechanism for erecting the antenna is illustrated generally at 99, Fig. 9, and comprises a member that embodies a combustion chamber 100 and is attached at its one end to the nipple 34 of the bracket 25. At its other end the combustion chamber 100 comprises a compartment that contains a predetermined quantity of suitable explosive 101 confined between partitioning discs 102 and 103 of Celluloid or the like combustible material. The end of combustion chamber 100 that contains explosive 101 also has attached thereto the igniter or detonator 104 in the form of a modified automotive spark plug, the modification comprising an electrical heating coil 105 connected between the positive and ground terminals. The space adjacent to the Celluloid disc 102 that is occupied by the heating coil 105 also contains an explosive 106. Under preferred practice, the explosive 101 consists of slow-burning granulated powder that has a high volumetric expansion, and the explosive 106 consists of black powder that detonates when subjected to a temperature lower than is required for detonating explosive 101.

The baffle 107 is positioned between the combustion chamber 100 and the nipple 34 with washers 112 serving as a seal. Aperture 108 in baffle 107 constitutes a constricted passage for gas generated by the explosives 101 and 106 from the combustion chamber 100 into the cavity 109 of nipple 34. Passage 110 permits the expanding gases to enter the cavity 111 of nipple 26 from the cavity 109, and from the cavity 111 the gases enter the cylinder of tube 15 through the aperture of bushing 27 formed by the shoulder 28.

An electrical lead 115, which is covered with waterproof insulation, connects the heating coil 105 in circuit with the battery 46, as seen in the wiring diagram of Fig. 4. Housing 116 is provided to enclose and protect the igniter 104. An aperture 117 in the housing 116 serves as a conduit for the lead 115 to the exterior of the housing 116, for connecting ignitor 104 with battery 46. The housing 116 also includes the suspension eye 118, the purpose of which will be described more fully hereinafter.

When the battery 46 becomes energized by contact with water, it heats the coil 105 until the temperature thereof becomes high enough to ignite the black powder 106 which then detonates the slow burning powder 101. Gas is thereby generated, which is expanded into the cavity 109 through the aperture 108 of baffle 107, and from the cavity 109 into cavity 111 through the passage 110. The expanding gases then enter the tube 15 through bushing 27, and they operate in tube 15 to drive the several antenna tubes 73, 74 and 75 into extended position to erect the antenna 22. Expansion of the gases in the combustion chamber 100 into the cylinder of tube 15 through the intermediate cavities 109 and 111 produces a less violent but more prolonged and persistent actuation of the antenna tubes 73, 74 and 75 to erect the antenna 22.

The expanding gases act against the end of internal tube 73 that is closed by button 76, which presses against the water weakened disc 91 of blotting paper, thereby shearing disc 91 and driving it and attached disc 92 through the apertured cap 94. Internal tube 73, and each intermediate tube 74 travels to project beyond the vertex of its next larger tube 74 or 75 until its pair of annular ridges 77 lodges between the sets 78 and 79 of lengthwise ridges at the vertex of its next larger tube 74 or 75. In a similar manner, the annular ridge 86 of the exterior tube 75 together with the retaining member 80 are guided along the inside wall of tube 15 until they lodge in the recess 87 of the sleeve 65, and when this is accomplished the retaining member 80 serves as an electrical conductor between the antenna 22 and its terminal 88.

*Signalling component*

Because the mass of the signalling component 17 is a relatively small part of the total mass of the radio transmitter, it is preferable to house the entire signalling component within the buoyancy chamber 55, Fig. 7. The metal buoyancy chamber 55 shields the signalling component 17 from outside electrical disturbances, and prevents de-tuning that would otherwise result from the draft varying by the apparatus bobbing on the surface of water. The several elements of the signalling component 17 are therefore mounted to be supported by the tube 15 inside chamber 55, chassis 120 being provided for the purpose.

The chassis 120, according to preferred construction, comprises a disc that fits loosely in and is easily inserted into the container 56. The chassis 120 is rigidly attached to a central bushing 121 that fits around the tube 15, a companion sleeve 122 being provided that also fits exteriorly of the tube 15 and is threaded into the bushing 121. The packing 123 of rubber or the like compressible material is enclosed in the bushing 121 to press into firm frictional engagement with the exterior wall of the tube 15 when subjected to compression by the sleeve 122 being tightened in the bushing 121, and the washer 124 is included in the structure to prevent the packing from twisting by frictional engagement with the sleeve 122.

The coil illustrated generally at 125 in Fig. 7, which may for example constitute the radio frequency inductor coil 125 in Fig. 4, is supported by the chassis 120 on the spacer sleeve 126 that bears against bushing 121 and serves to locate coil 125 lengthwise of the tube 15. The coil 125 includes the main winding 127, consisting of a predetermined number of turns of wire held in position by sets of opposed inside and outside staves 128 and 129 respectively, the companion inside and outside staves being adhered or otherwise attached together, and being adhered or otherwise attached at their ends to the opposite heads 130 of dielectric material. The nut 131, by engagement with the spacer sleeve 132, presses the winding 127 firmly against the sleeve 126 and through sleeve 126 against the bushing 121, by screw threaded engagement of the nut 131 with the tube 15 as shown.

The tuning coil or winding 133 is a continuation of coil 125 and is connected in series with the main winding 127. Winding 133 comprises a predetermined number of turns of wire wound on the spool or tube 134 of dielectric material, rings 135 of dielectric material being adhered or otherwise attached to the tube 134 to complete the assembly of winding 133. The winding 133 is attached to and carried by the chassis 120 by means of the rings 135 being adhered or otherwise attached to one of the external staves 129 of the assembly of winding 127.

The permeability core 136 is adjustably movable into different positions lengthwise in the winding 133 for tuning coil 125 to a predetermined desired wave length, and for making the desired antenna matching adjustment. Core 136 is carried by the chassis 120 and is supported by the rod 137 that is attached to the chassis 120 in adjusted position lengthwise of winding 133 by means of nuts 138. The core 136 is connected to its support rod 137 by means of the adjustment rod 139 and through the intermediate insulator 140. The core 136 is slotted at 141 to receive a screw driver or the like tool for varying the position of the core 136 in the winding 133. Tuning adjustment can be made in the assembled apparatus preparatory to it being launched, the removable plug 142 of rubber or the like resilient water-tight material being provided for the purpose to enable a screw driver or the like tool to be inserted into chamber 55 through the hole that is closed by plug 142.

Other elements of the signalling component 17 that appear in the wiring diagram of Fig. 4 are preferably mounted on the chassis 120, but the manner of mounting these elements can follow well-known prior-art practice, and requires no further detailed description herein.

Electrical connections between parts of the power pack 18 embodied in the ballast mass 12 and parts of the signalling component 17 embodied in the buoyancy component 11 are made by means of the leads 44 of the formed cable, the leads being insulated each with a waterproof jacket. The leads 44 enter the buoyancy chamber 55 through the watertight grommet or fitting 143, and comprise the terminals 144. Electrical connections within the chamber 55 between the terminals 144 and parts of the transmission component 17 can be made in any suitable manner understood by persons skilled in the art from the wiring diagram of Fig. 4, and this requires no further detailed description herein.

*Self-scuttling device*

It is desirable that the signalling apparatus of the present invention be kept out of the hands of unauthorized persons, and for this purpose the device of the invention is adapted to destroy itself after it has served its purpose of sending out signals. Mechanism that destroys the device is embodied in the time-delay scuttling valve, illustrated generally at 150, Fig. 7.

The scuttling valve 150 comprises a container or cup 151, which is attached rim downwardly by brazing or other suitable means to the inside of the lid or closure 57 that forms the bottom of the buoyancy chamber 55 when the device is afloat on a body of water. A second cup 152 is similarly attached to the cup 151, at a position thereof away from its attachment to the closure 57, and a third cup 153 is attached to the cup 152 in a similar manner. As many cups 151, 152, 153, etc., are provided as are required to afford the desired time-delay for scuttling the device. The cups 151, 152, 153, constitute a series of containers through which water must pass to enter the buoyancy chamber 55, and each cup has an aperture 154 in its partitioning surface that communicates with the next adjacent container in the series, the aperture 154 of the last cup 153 in the series communicating with the buoyancy chamber 55. The surface of each cup 151, 152, 153 that contains the aperture 154 is depressed in a direction that is downward when the apparatus floats on a body of water, whereby the aperture 154 dips downwardly towards the surface of water contained in its incident cup. The size of each aperture 154 is predetermined to provide the required time metering for the desired time-delay.

Water passes from outside the buoyancy chamber 55 through the lid 57 into the first cup 151 of the series, the passage being through the fitting 155, which is attached to the lid 57 by means of the grommet or gasket 156 of rubber or the like resilient material. Water enters the central bore 157 of the fitting 155 through the constricted port 158 and the passage for water to enter port 158 comprises the annular groove 159 that is narrower than the opening of port 158 but has a greater flow area. This construction operates to filter foreign solid matter out of the water that flows through the fitting 155, and prevents it from entering the port 158. The annular groove 159 is formed by the overhanging apron of the cap 160.

From the time the apparatus enters the water, any water that flows through fitting 155 is trapped by the cups 151, 152 and 153 and does not enter the chamber 55 until the cups are filled. After the apparatus takes position on the water surface for sending signals, with the ballast mass 12 directed downwardly, the closure 57 is at the bottom of chamber 55 and under water. Water flows into the cup 151 through the fitting 155, any air in the cup 151 is expelled into cup 152 through its aperture 154. This continues until the water level in the cup 151 reaches the level of the aperture 154 therein, when water flows from cup 151 into cup 152 to fill it and overflow into cup 153 until it becomes full. Air from the cups being expelled through apertures 154 into chamber 55. When all the cups 151, 152, 153 become full, water flows into the buoyancy chamber 55, which by that time is calculated to have served its purpose of sending a series of signals, the flow of water into buoyancy chamber 55 continuing until it becomes water-logged and sinks.

Air is driven out of the buoyancy chamber 55 by water entering through the scuttling valve 150, and the air-escape valve 161 is provided for the purpose. The air-escape valve 161 comprises the fitting 162, which is attached to the buoyancy chamber 55 at its top by means of the grommet or gasket 163, in a manner similar to the fitting 155. The fitting 162 also includes the central bore 164, and the outlet port 165 that is constricted in a manner similar to port 158. Port 165 communicates with the annular groove 166 formed by the overhanging apron of the cap 167. The annular groove 166 is narrower than the port 165 and operates to filter foreign matter out of any water that enters the chamber 55 through the fitting 162.

When the device strikes the water, the bottom of the container 56 which embodies the fitting 162 is directed downwardly, and it is submerged until the apparatus rights itself for sending signals. Water that passes through the fitting 162 is trapped in the baffle cup 168 that is attached to the grommet 163 in the manner shown. The aperture 169 through the cup 168 is in the reentrant bottom thereof as shown so that, when the apparatus is righted for sending signals, the aperture 169 is positioned above the level of any water that may have become trapped in the cup 168. The water trapping cup 168 prevents water from getting into damaging contact with the electrical apparatus housed in the chamber 55, and permits the escape of air from the chamber 55 that is displaced by water entering the scuttling valve 150.

*Parachute pack*

Parachute 175 is attached to the apparatus at the ballast mass end 12 thereof, as illustrated Fig. 2, whereby the apparatus is suspended during its descent with its center of gravity located near its point of support. The load carrying web 176 of the parachute 175 is lashed or tied to the suspension eye 118 of the igniter housing 116, parachute 175 being attached to the load carrying web 176 by means of the shroud lines 177.

Cover 178 is provided, which in the preferred disclosed embodiment comprises a container of canvas or other suitable cloth. The cover 178 is attached to the parachute 175 at its top by means of the cord or line 179, the tensile strength of cord 179 being sufficient to extend the parachute from its folded to its expanded condition, but being so low that it breaks readily under the weight of the apparatus of the invention. The lanyard or lash 180 at one of its ends is attached to the cover 178 at its top as shown, and is strong enough to carry the weight of the apparatus. The lash 180 is long enough to permit the apparatus to fall from the launching aircraft out of range of the ambient air currents thereof before the lash 180 becomes taut. The end of the lash 180 opposite the cover 178 is adapted to be tied to the launching craft, and when the apparatus is thrown from the craft, it falls to a position out of range of ambient air currents thereof until the lash 180 is jerked by the weight of the apparatus.

When the apparatus is in assembled condition and ready for launching, the parachute 175 is folded in any suitable manner and packed around the elements of the ballast mass 12 that are mounted on plate 35. The cover 178 is positioned over the folded parachute 175 with the line or cord 179 also enclosed in it, and cover 178 is attached at its hem or edge to the plate 35 by means of ties 181 that are passed through holes 182 arranged circumferentially of the plate 35 near its edge. The tensile strength of the ties 181 is so low that they are readily torn when subjected to the weight of the apparatus.

Operation

The apparatus can be launched from an aircraft in flight in any suitable manner, preferred practice being to adapt the device to be fired from a launching gun for signal flares or the like, such as are in common use on military aircraft. The device comprises a compact mass, and when it is launched it falls away from the aircraft in compact condition a distance determined by the length of the lanyard or lash 180. When the device has fallen the predetermined desired distance the lash 180 is drawn taut, and the weight of the apparatus applies shock tension that tears the ties 181. The cover 178 is thereby pulled away from the plate 35, and the apparatus continues to fall freely. The cover 178 thereby pulls on cord 179 and extends the parachute 175. When the parachute 175 becomes fully extended in condition to become airborne, the weight of the apparatus again jerks the lash 180 and the cord or line 179 is thereby torn under the weight of the apparatus. The parachute 175 is now in extended condition ready to become airborne. The lanyard 180, with the cover 178 attached to its terminal end, continues to be attached to the aircraft.

It will be noted that the ballast mass 12 is disposed upwardly while the device descends under parachute support, positioning the center of gravity of the apparatus close to the parachute 175. Accordingly, atmospheric air currents are less able to divert the apparatus from direct downward travel, and the apparatus therefore descends to the earth with minimum deviation from a vertical path. Location of the apparatus on the surface is accordingly more accurately determinable with reference to the position of the launching craft.

When the device strikes the water, it first submerges, due to the momentum of its fall, but the buoyancy chamber 55 comes to the surface quickly, and the ballast mass 12 is suspended downwardly as illustrated in Fig. 3. The water begins to operate immediately to activate the battery 46, and when it has been activated sufficiently to supply the required electrical power, it operates to heat the heating element 105 of the antenna erecting drive 99, causing explosives 106 and 101 to detonate. Meantime, the water absorbed by the blotting paper disc 91 of the closure 90 while it was submerged has caused it to deteriorate and lose its strength, and it is unable to resist the pressure applied by the abutment button 76 when gases generated by explosives 106 and 101 operate to erect the antenna 22.

The gases generated by explosives 106 and 101 in the combustion chamber 100 are confined in the combustion chamber 100 by the baffle 107, only restricted flow into cavity 109 being allowed through constricted passage 108. In a similar manner, only restricted flow of gases from cavity 109 to cavity 111 that joins through bushing 27 with the tube 15 is permitted through the constricted passage 110. Thus, in their passage from the combustion chamber 100 to the tube 15, the gases go through two stages of pressure reduction in the respective expansion chamber 109 and 111, providing a more uniform, steady and continuous supply of pressure fluid that operates in tube 15 to erect the antenna 22 than would be supplied by the explosive directly.

The expanding gases that enter the tube 15 operate to actuate the interior tube 73 and each intermediate tube 74 lengthwise of its respective next larger tube 74 or 75, and operate to actuate the exterior tube 75 lengthwise of tube 15, until all the pairs of annular ridges 77 lodge between the sets of longitudinal ridges 78 and 79 of next larger tubes 74 or 75, and the annular ridge 86 with the retaining member 80 of exterior tube 75 lodge in the recess 87 of the sleeve 65.

The heat of combustion of the explosives 101 and 106 operates to destroy the heating coil 105, opening the electrical circuit thereof, and needless consumption of electrical energy is thereby avoided.

The activated battery 46 also operates to supply electrical energy to the radio transmitter constituting components 17 and 18, in a manner that will be clear to persons skilled in the art from the illustration of Fig. 4. Radio signals are thereby transmitted at a predetermined and known wave length and frequency, which can be picked up by any suitable receiving set. Operation of the radio transmitter, and also of the antenna erecting mechanism, is instituted by the battery 46 becoming activated when it enters the water, and the need of electrical switches is thereby entirely eliminated from the apparatus.

The signalling apparatus of the disclosure has a number of advantageous uses. For example, if a pilot is flying a planned course over a large body of water that lacks landmarks, and he desires to determine if and to what extent he is being blown off course by adverse winds, by launching a signalling apparatus embodying the present invention he is enabled to receive the signals therefrom through his direction finder. He thereby determines his direction of flight with reference to the signalling apparatus he has placed on the water, and he can interpret this information with reference to his apparent course as determined by the trim of the craft, to thereby ascertain the amount that the aircraft is drifting from its planned direction of flight.

After the device of the invention has served its purpose to send out the desired signals, it automatically destroys itself after a predetermined time interval by means of the scuttling valve 150.

The structure of the drawing constitutes one practical embodiment of the invention, which can be modified in a number of ways without departing from the scope and spirit of the invention. Accordingly, the invention is not limited to the specific structure disclosed, but scope of the invention is determined by the accompanying claims.

The invention described herein may be manufactured and used by or for the Government of the United States of America for governmental purposes without the payment of any royalties thereon or therefor.

What is claimed is:

1. In a signalling device, a radio transmitter including an antenna, a tube supporting the antenna, a buoyancy chamber attached to the tube at one end thereof, a support attached to the tube at the other end thereof and carrying components of the transmitter that embody the major portion of its mass, the support with the transmitter components carried thereby constituting a ballast mass.

2. In a signalling device, a radio transmitter including an antenna, a tube supporting the antenna, a buoyancy chamber attached to the tube at one end thereof, a support attached to the tube at the other end thereof and carrying components of the transmitter that embody the major portion of the mass thereof, the support with the transmitter components carried thereby constituting a ballast mass, a parachute attached to the device at the end thereof embodying the ballast mass.

3. In a signalling device, a radio transmitter comprising a power pack and an antenna, a tube supporting the antenna, a buoyancy chamber attached to the tube at its one end, the power pack being attached to the tube at its other end and serving as ballast mass.

4. In a signalling device as defined in claim 5, the transmitting component being contained in the buoyancy chamber.

5. In a signalling device as defined in claim 5, the transmitting component being contained in the buoyancy chamber and electrically shielded thereby.

6. In a signalling device, a radio transmitter comprising a power pack, an antenna and an electrical energy generator, a tube supporting the antenna, a buoyancy chamber attached to the tube at its one end, the power pack and the generator being attached to the tube at its other end and serving as ballast mass.

7. In a signalling device, a radio transmitter including an antenna and an electrical energy generator, a tube supporting the antenna, an elongated buoyancy chamber attached to the tube at its one end, the tube extending from the attachment through the buoyancy chamber lengthwise thereof and projecting therebeyond, the electrical energy generator being attached to the projecting end of the tube and serving as ballast mass.

8. In a signalling device, a radio transmitter comprising a power pack, an antenna, and an electrical energy generator, a tube supporting the antenna, an elongated buoyancy chamber attached to the tube at its one end, the tube extending from the attachment through the buoyancy chamber lengthwise thereof and projecting therebeyond, the power pack and the electrical energy generator being attached to the projecting end of the tube and serving as ballast mass.

9. In a signalling device, a radio transmitter comprising a power pack, a transmitting component, an antenna, and an electrical energy generator, a tube supporting the antenna, an elongated buoyancy chamber attached to the tube at its one end, the tube extending from the attachment through the buoyancy chamber lengthwise thereof and projecting therebeyond, the power pack and the electrical energy generator being attached to the projecting end of the tube and serving as ballast mass, the transmitting component being housed in the buoyancy chamber.

10. In a signalling device, a radio transmitter comprising an antenna, a tube containing the antenna, an elongated buoyancy chamber attached to the tube at its one end, the tube extending from the attachment through the buoyancy chamber lengthwise thereof and projecting therebeyond, an antenna erecting device attached to and operable at the projecting end of the tube to actuate the antenna out of the end of the tube attached to the buoyancy chamber and to project the antenna beyond the buoyancy chamber.

11. In a signalling device, a radio transmitter comprising an antenna and an electrical energy generator, a tube containing the antenna, a buoyancy chamber attached to the tube at its one end, the electrical energy generator being attached to the tube at its other end and serving as ballast mass, an antenna erecting device operable at the end of the tube to which the generator is attached and comprising an explosive, a detonator operable electrically from the electrical energy generator, and a passage from the explosive to the end of the tube to which the generator is attached for the gases derived from the explosive, whereby the antenna is erected by being projected out of the end of the tube attached to the buoyancy chamber.

12. In a signalling device, a radio transmitter comprising components of heavier and lighter weight respectively and an extensible antenna, a tube containing the antenna, an elongated buoyancy chamber attached to the tube at its one end, the tube extending from its attachment through the buoyancy chamber lengthwise thereof and therebeyond, the heavier components of the radio transmitter being attached to the tube at the projecting end thereof and serving as ballast mass.

13. In a signalling device as defined in claim 12, the lighter components of the radio transmitter being housed in the buoyancy chamber.

14. In a signalling device as defined in claim 12, an antenna erecting device operable to erect the antenna by projecting it out of the end of the tube attached to the buoyancy chamber.

15. In a signalling device, a radio transmitter comprising components of heavier and lighter weight respectively, an extensible antenna and a battery that is activated by contact with water, a tube containing the antenna in collapsed condition, an elongated buoyancy chamber attached to the tube at one end thereof, the tube extending from the attachment through the buoyancy chamber lengthwise thereof and projecting therebeyond, the heavier components of the radio transmitter and the battery being attached to the tube at the projecting end thereof and serving as ballast mass, an electrically operable antenna-erecting device operable to erect the antenna by projecting it out of the end of the tube attached to the buoyancy chamber, the battery operating to supply energy to the radio transmitter and to the antenna erecting device by the signalling device being placed in water.

16. In a signalling device, a radio transmitter comprising components of heavier and lighter weight respectively, an extensible antenna and an electrical energy generator, a tube containing the antenna in collapsed condition, an elongated buoyancy chamber attached to the tube at its one end, the tube extending from the attachment through the buoyancy chamber lengthwise thereof and projecting therebeyond, the heavier components of the transmitter and the generator being attached to the tube at the projecting end thereof and serving as ballast mass, an antenna erecting device operable to erect the antenna by projecting it out of the end of the tube attached to the buoyancy chamber.

17. In a signalling device as defined in claim 16, the electrical energy generator comprising a battery that is activated by contact with water.

18. In a signalling device, a radio transmitter comprising heavier and lighter weight components and including an extensible antenna, a tube containing the antenna, a buoyancy chamber attached to the tube at its one end, the heavier components of the transmitter being attached to the tube at its other end and serving as ballast mass, a closure for the tube at the end thereof attached to the buoyancy chamber and being destructible by contact with water, an antenna erecting instrumentality operable when the device is placed in water to erect the antenna by projecting it out of the end of the tube that is attached to the buoyancy chamber, a parachute for the signalling device attached thereto at the end embodying the ballast mass.

19. A device for transmitting signals comprising, an electrical energy generator and a radio transmitter including an antenna, a tube housing the antenna, a buoyancy chamber attached to the tube at its one end, the heavier components of the transmitter being attached to the tube at its other end and serving as ballast mass, a parachute attached to the device at the end thereof embodying the ballast mass.

20. A device for transmitting signals comprising an electrical energy generator and a radio transmitter including an antenna, a tube housing the antenna, a buoyancy chamber attached to the tube at its one end, a support bracket attached to the tube at its other end, the generator and the heavier components of the transmitter being attached to the bracket and serving as ballast mass, a parachute attached to the device at the end thereof embodying the bracket.

21. A device for transmitting signals comprising an electrical energy generator and a radio transmitter including an extensible antenna, a tube housing the antenna, a buoyancy chamber attached to the tube at its one end, a support bracket attached to the tube at its other end, mechanism operable by the device contacting water to erect the antenna by projecting it out of the end of the tube that is attached to the buoyancy chamber, the generator and the antenna erecting mechanism being attached to the bracket and serving as ballast mass, a parachute attached to the device at the end thereof embodying the bracket.

22. In a device for transmitting signals, an electrical energy generator and a radio transmitter including an antenna, a tube housing the antenna, mechanism operable by the device contacting water to erect the antenna by projecting it out of one end of the tube, a buoyancy chamber disposed around the tube and extending lengthwise thereof with one of its ends positioned near the end of the tube from which the antenna is adapted to be projected, a support bracket attached to the other end of the tube, the generator and the antenna erecting mechanism being attached to the bracket and serving as ballast mass, a parachute attached to the device at the end thereof embodying the bracket.

23. In a portable radio transmitter, an extensible antenna comprising a set of tubes fitted one within the other, a plurality of annular grooves near the base end of each smaller tube and spaced apart lengthwise thereof, a set of longitudinal grooves arranged peripherally of each next larger tube and disposed at the vertex thereof, a similar set of longitudinal grooves near the vertex of each next larger tube and disposed spaced apart from the set of grooves at the vertex, the two sets of longitudinal grooves in each larger tube being spaced apart an amount that encompasses the spaced apart annular grooves of the next smaller tube, and antenna erecting mechanism operable to project each smaller tube out of the vertex end of its next larger tube with its annular grooves lodged between the spaced-apart sets of longitudinal grooves thereof.

24. An extensible antenna comprising a set of tubes fitting one within another, a plurality of annular grooves near the base end of each smaller tube and spaced apart lengthwise thereof a set of longitudinal grooves arranged peripherally of each next larger tube and disposed at the vertex thereof, a similar set of longitudinal grooves near the vertex of each next larger tube and disposed spaced apart from the set of longitudinal grooves at the vertex, the two sets of longitudinal grooves in each larger tube being spaced apart an amount that encompasses the spaced apart annular grooves of the next smaller tube.

25. An extensible antenna comprising a set of metallic tubes fitting one within another and arranged telescopically, a tube of dielectric material housing the metallic tubes in collapsed condition, a metallic sleeve attached to the outward end of the dielectric tube and comprising a stepped bore that provides an annular recess at the end of the dielectric tube of larger diameter than the inside diameter of the dielectric tube, an electrical terminal exteriorly of the sleeve, an electrical conductor at the base end of the largest metallic tube pressing resiliently outwardly against the inside wall of the dielectric tube, the electrical conductor seating in the recess in electrical contact with the sleeve when the antenna is erected and projecting out of the end of the dielectric tube.

26. In signalling apparatus adapted to be launched from an aircraft in flight to operate on the surface of a body of water, a buoyancy chamber at one end thereof, a ballast mass at the other end thereof, a parachute attached to the apparatus by being attached to the ballast mass thereof, a parachute cover enclosing the parachute in folded condition, a parachute-extending line between the cover and the parachute and having insufficient strength to support the weight of the apparatus, ties attaching the cover to the apparatus with the parachute in folded condition enclosed therein, the ties having insufficient strength to support the weight of the apparatus, a launching line of greater strength than either the parachute extending line or the ties, the launching line having a predetermined length and being attached at one of its ends to the cover exteriorly thereof.

27. In a signalling apparatus adapted to be launched from an aircraft in flight, a parachute pack comprising a parachute attached to the apparatus, a cover for the parachute enclosing it in folded condition, a parachute-extending line attaching the cover to the parachute and having insufficient strength to support the weight of the apparatus, ties holding the cover in parachute enclosing position and having insufficient strength to support the weight of the apparatus, a launching line of predetermined length and being attached at its one end to the cover, the line being attachable to the aircraft at its other end, the launching line having greater strength than either the ties or the parachute-extending line.

28. For launching a load from an aircraft in flight, a parachute pack comprising a parachute attached to the load to carry it, a cover enclosing the parachute in folded condition, ties attaching the parachute cover to the load with the parachute held in folded condition against the load, the ties having insufficient strength to carry the weight of the load, a parachute-extending line attaching the cover to the parachute and having insufficient strength to support the weight of the load but sufficient strength to extend the parachute, a launching line of predetermined length and being attached at its one end to the cover, and being attachable to the aircraft at its other end, the launching line having greater strength than either the ties or the parachute extending line.

RAYMOND L. FREAS.

REFERENCES CITED

The following references are of record in the file of this patent:

UNITED STATES PATENTS

| Number | Name | Date |
|---|---|---|
| 434,354 | Overton | Aug. 12, 1890 |
| 1,226,905 | Neumann | May 22, 1917 |
| 2,217,188 | Snyder | Oct. 8, 1940 |
| 2,310,017 | Canon et al. | Feb. 2, 1943 |
| 2,344,425 | Snyder | Mar. 14, 1944 |
| 2,361,177 | Chilowsky | Oct. 24, 1944 |
| 2,365,886 | Lehmann | Dec. 26, 1944 |
| 2,402,143 | Arenstein | June 18, 1946 |
| 2,478,866 | Freas | Aug. 9, 1949 |
| 2,497,852 | Arenstein | Feb. 21, 1950 |
| 2,551,609 | Kohr et al. | May 8, 1951 |
| 2,555,867 | Bennett | June 5, 1951 |